United States Patent
Tan et al.

(10) Patent No.: US 10,961,943 B1
(45) Date of Patent: Mar. 30, 2021

(54) METHOD AND SYSTEM FOR CONTROLLING COMBUSTION OF NATURAL GAS ENGINE

(71) Applicant: WEICHAI POWER CO., LTD., Weifang (CN)

(72) Inventors: Xuguang Tan, Weifang (CN); Dehui Tong, Weifang (CN); Xiaoyan Wang, Weifang (CN); Zhijie Li, Weifang (CN); Xiaoying Xu, Weifang (CN); Qiang Zhang, Weifang (CN); Guoxiang Li, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/015,879

(22) Filed: Sep. 9, 2020

(30) Foreign Application Priority Data

Jan. 14, 2020 (CN) .......................... 202010034279.0

(51) Int. Cl.
*F02D 41/30* (2006.01)
*F02D 41/00* (2006.01)
(Continued)

(52) U.S. Cl.
CPC ............ *F02D 41/3076* (2013.01); *F02B 7/08* (2013.01); *F02D 19/0642* (2013.01); *F02D 19/0647* (2013.01); *F02D 19/10* (2013.01); *F02D 19/105* (2013.01); *F02D 41/009* (2013.01); *F02D 41/2432* (2013.01); *F02D 41/3047* (2013.01);
(Continued)

(58) Field of Classification Search
CPC ............ F02D 41/3076; F02D 41/009; F02D 41/2432; F02D 41/403; F02D 19/105; F02D 41/3047; F02D 41/401; F02D 41/3094; F02D 2200/0616; F02D 2200/0602; F02D 2200/0406; F02D 2041/389;
(Continued)

(56) References Cited

U.S. PATENT DOCUMENTS

| 4,719,880 A | 1/1988 | Schlunke et al. |
| 6,227,151 B1 | 5/2001 | Ma |

(Continued)

FOREIGN PATENT DOCUMENTS

| CN | 109441626 A | 3/2019 |
| JP | 2001-512208 A | 8/2001 |

*Primary Examiner* — Carl C Staubach
(74) *Attorney, Agent, or Firm* — Fenwick & West LLP

(57) ABSTRACT

A method and a system for controlling combustion of a natural gas engine. The method includes: determining, based on a current operation parameter of a natural gas engine, an operation state of the natural gas engine, and calculating a total injection quantity of natural gas and pilot diesel required by the natural gas engine in the operation state; adopting a direct injection diffusion-combustion mode in a case that the operation state is an idle state or a low load state; adopting a natural gas homogeneous hybrid active control compression-ignition mode in a case that the operation state is a medium load state; configuring the total injection quantity into three parts including a compression-ignition natural gas injection quantity, a pilot diesel injection quantity, and a diffusion-combustion natural gas injection quantity in a case that the operation state is a high load state, and sequentially injecting them into a combustion chamber.

12 Claims, 2 Drawing Sheets

(51) Int. Cl.
*F02D 41/24* (2006.01)
*F02B 7/08* (2006.01)
*F02D 19/10* (2006.01)
*F02M 21/02* (2006.01)
*F02D 41/40* (2006.01)
*F02D 19/06* (2006.01)
*F02D 41/38* (2006.01)

(52) U.S. Cl.
CPC ....... *F02D 41/3094* (2013.01); *F02D 41/401* (2013.01); *F02D 41/403* (2013.01); *F02M 21/0215* (2013.01); *F02D 2041/389* (2013.01); *F02D 2200/0406* (2013.01); *F02D 2200/0414* (2013.01); *F02D 2200/0602* (2013.01); *F02D 2200/0616* (2013.01); *F02D 2200/101* (2013.01)

(58) Field of Classification Search
CPC ....... F02D 2200/101; F02D 2200/0414; F02B 7/08; F02M 21/0215
See application file for complete search history.

(56) References Cited

U.S. PATENT DOCUMENTS

| | | | |
|---|---|---|---|
| 9,790,869 B2* | 10/2017 | Flynn | F02D 41/0025 |
| 10,550,790 B2* | 2/2020 | Ravi | F02D 41/3064 |
| 2002/0007816 A1* | 1/2002 | Zur Loye | F02D 41/403 |
| | | | 123/295 |
| 2002/0040692 A1 | 4/2002 | LaPointe et al. | |
| 2008/0283006 A1* | 11/2008 | Sutherland | F02D 13/0265 |
| | | | 123/90.15 |
| 2009/0012698 A1* | 1/2009 | Shinagawa | F02D 13/0215 |
| | | | 701/103 |
| 2009/0031985 A1* | 2/2009 | Kuzuyama | F02B 11/00 |
| | | | 123/27 GE |
| 2014/0025277 A1* | 1/2014 | Masubuchi | F02D 15/00 |
| | | | 701/104 |
| 2014/0032081 A1* | 1/2014 | Willi | F02D 41/0057 |
| | | | 701/104 |
| 2015/0308362 A1* | 10/2015 | Dunn | F02M 21/0215 |
| | | | 123/300 |

* cited by examiner

METHOD AND SYSTEM FOR CONTROLLING COMBUSTION OF NATURAL GAS ENGINE

CROSS-REFERENCE TO RELATED APPLICATION

The application claims the priority to Chinese Patent Application No. 202010034279.0, titled "METHOD AND SYSTEM FOR CONTROLLING COMBUSTION OF NATURAL GAS ENGINE", filed on Jan. 14, 2020 with the China National Intellectual Property Administration (CNIPA), the content of which is incorporated herein by reference in its entirety.

TECHNICAL FIELD

The present disclosure relates to the technical field of combustion of a natural gas engine, and in particular, to a method and a system for controlling combustion of a natural gas engine.

BACKGROUND

In recent years, the large-scale haze weather has brought a great impact on the production and the life of the residents, and endangered people's health. The particles emitted by motor vehicles are one of the main sources of urban smog.

According to different fuels used by the motor vehicles, the motor vehicles include diesel (gasoline) motor vehicles and natural gas motor vehicles. The natural gas motor vehicles use natural gas as fuel. Since methane in the natural gas does not contain carbon chains, the amount of soot generated during the combustion of the natural gas is relatively low. Therefore, the use of natural gas as fuel for motor vehicles can effectively control emissions and is of great significance to alleviating environmental pollution.

The increase of compression ratio of a conventional natural gas engine is knock-limited. In addition, due to the slow combustion speed of the natural gas, the thermal efficiency and power performance of the natural gas engine operating in a traditional combustion mode are lower than those of a diesel engine with the same displacement.

In order to improve the thermal efficiency and power performance of the natural gas engine, according to a conventional method, a small amount of diesel is injected at a position near the top dead center of compression, and then the natural gas is injected to the flame in burning the pilot diesel so as to be burned by the burning diesel, realizing diffusion combustion of the natural gas. In this combustion mode, the natural gas engine is not knock-limited and has a thermal efficiency and power performance close to those of the diesel engine with the same displacement.

Studies show that in the above method, the diesel is injected for combustion of the natural gas, a fuel rich zone exists during the combustion process of natural gas, and a certain amount of soot is still generated. Although the amount of the PM (Particulate Matter) and PN (Particulate Number) in the exhaust gas emitted by the natural gas engine is much lower than the amount of the PM and PN in the exhaust gas emitted by the diesel engine, a post-processing system is required to be configured as that of the diesel engine to meet a strict Euro VI emission standard, thereby resulting in a high cost.

SUMMARY

A method for controlling combustion of a natural gas engine is provided in the present disclosure. The method includes: determining, based on a current operation parameter of a natural gas engine, an operation state of the natural gas engine; calculating a total injection quantity of natural gas and pilot diesel required by the natural gas engine in the operation state; adopting a direct injection diffusion combustion mode in a case that the operation state is an idle state or a low load state, wherein the direct injection diffusion combustion mode is a mode in which the diesel is injected at a top dead center of compression, and then the natural gas is injected; adopting a natural gas homogeneous hybrid active control compression-ignition mode in a case that the operation state is a medium load state, wherein the natural gas homogeneous hybrid active control compression combustion mode is a mode in which the natural gas is injected after an intake valve is closed and the diesel is injected at a position before the top dead center of compression; configuring the total injection quantity into three parts including a compression-ignition natural gas injection quantity, a pilot diesel injection quantity, and a diffusion-combustion natural gas injection quantity in a case that the operation state is a high load state; injecting natural gas with the compression-ignition natural gas injection quantity into a combustion chamber so as to be mixed with air inside the combustion chamber, in an early stage of a compression stroke of the natural gas engine; injecting, at a position near the top dead center of compression or at a large diesel injection advance angle, diesel with the pilot diesel injection quantity into the combustion chamber so as to ignite the pre-injected natural gas; and injecting, after a predetermined time interval, natural gas with the diffusion-combustion natural gas injection quantity into the combustion chamber, where the early stage of the compression stroke starts from a time instant when a crankshaft rotates at least 10 degrees after the intake valve is closed, where in the case that the operation state is the high load state, distribution of the compression-ignition natural gas injection quantity, the pilot diesel injection quantity, and the diffusion-combustion natural gas injection quantity is optimized according to a following rule during the combustion of the natural gas engine: decreasing the compression-ignition natural gas injection quantity and decreasing the pilot diesel injection quantity, and increasing the diffusion-combustion natural gas injection quantity, with increasing of load of the natural gas engine.

With the method for controlling combustion of a natural gas engine according to the present disclosure, there may be three combustion modes based on different operation states of the natural gas engine, greatly improving the thermal efficiency and power performance of the natural gas engine, greatly reducing the amount of the produced soot, making the amount of the PM and PN in the exhaust gas emitted by the natural gas engine much lower than the amount of the PM and PN in the exhaust gas emitted by the diesel engine, thus meeting the strict Euro VI emission standard without providing a post-processing system, thereby reducing the production cost of a natural gas system.

In an embodiment, the method further includes: determining, based on a pre-stored map chart, the operation state and a compression-ignition natural gas injection quantity, a pilot diesel injection quantity, and a diffusion-combustion natural gas injection quantity during different stages of the natural gas engine in the high load state, where in the map chart, the operation state of the natural gas engine which is determined based on a torque or a speed of the natural gas engine is calibrated, and a compression-ignition natural gas injection quantity, a pilot diesel injection quantity, and a diffusion-combustion natural gas injection quantity in a different load state of the natural gas engine are calibrated.

In an embodiment, injection pressures, injection pulse widths and injection advance angles for injecting the compression-ignition natural gas, the pilot diesel, and the diffusion-combustion natural gas in the different load state of the natural gas engine are calibrated in the map chart.

In an embodiment, calibrating parameters of each of operation states of the natural gas engine in the map chart includes: S10, initially configuring the calculated total injection quantity of the natural gas engine in the operation state into: an initial compression-ignition natural gas injection quantity, an initial pilot diesel injection quantity, and an initial diffusion-combustion natural gas injection quantity, wherein the initial compression-ignition natural gas injection quantity initially has a low distribution ratio; S11, calibrating parameters of a no load state of the natural gas engine firstly, adopting a low injection pressure for injecting the diesel and a low injection pressure for injecting the natural gas during the calibrating and gradually increasing the injection pressure for injecting the diesel and the injection pressure for injecting the natural gas; injecting the natural gas with the initial compression-ignition natural gas injection quantity in the early stage of the compression stroke; injecting, at the position near the top dead center of compression, the pilot diesel with the initial pilot diesel injection quantity; and injecting, after the predetermined time interval, the natural gas with the initial diffusion-combustion natural gas injection quantity, thereby maintaining the natural gas engine to operate stably; S12, keeping the injection pressure for injecting the natural gas, the initial compression-ignition natural gas injection quantity, the initial pilot diesel injection quantity, and the initial diffusion-combustion natural gas injection quantity in S11 unchanged, and gradually increasing an injection advance angle for injecting the diesel until the compression-ignition natural gas combusts in an active compression-ignition mode, wherein the injection advance angle for injecting the diesel ranges from 5 to 50 crank angles before the top dead center; and S13, keeping the injection pressure for injecting the natural gas in S11 and the injection advance angle for injecting the diesel in step S12 unchanged; gradually increasing the initial compression-ignition natural gas injection quantity, adjusting the initial pilot diesel injection quantity and reducing the initial diffusion-combustion natural gas injection quantity; collecting an indicator diagram and economy and emission data of the natural gas engine; analyzing a pressure rise rate, knock characteristics, and a maximum explosion pressure of the natural gas engine; and optimizing and determining an injection ratio of the compression-ignition natural gas.

In an embodiment, the calibrating parameters of each of operation states of the natural gas engine in the map chart further comprises: S14, gradually increasing the injection pressure for injecting the natural gas and the injection pressure for injecting the diesel, finely adjusting the injection quantities obtained in step S13 and injection advance angles in different stages, collecting, comparing and analyzing parameters of the natural gas engine, and determining optimal injection pressures, injection pulse widths and injection advance angles in different stages of the operation state.

In an embodiment, the calibrating parameters of each of operation states of the natural gas engine in the map chart further comprises: S15, after forming the map chart based on the obtained parameters of each of operation states in steps S10 to S14, optimizing the map chart in all load states based on a temperature fluctuation range of intake air of the natural gas engine and a temperature fluctuation range of coolant of the natural gas engine.

In an embodiment, the injection ratio of the compression-ignition natural gas in step S13 ranges from 10% to 50%.

In an embodiment, the injection pressure in the map chart ranges from 12 Mpa to 30 MPa, the injection pulse width ranges from a time period in which the crankshaft rotates 5 degrees to a time period in which the crankshaft rotates 30 degrees, and the injection advance angle ranges from 5 to 100 crank angles before the top dead center.

In an embodiment, the current operation parameter based on which the operation state of the natural gas engine is determined comprises one or more of a speed, a torque, an intake manifold temperature, and an intake manifold pressure of the natural gas engine.

In an embodiment, injection pressures for injecting the natural gas and the diesel range from 12 MPa to 18 MPa in the idle state or in the low load state, or/and injection pressures for injecting the natural gas and the diesel range from 18 MPa to 24 MPa in the medium load state, or/and injection pressures for injecting the natural gas and the diesel range from 24 MPa to 30 MPa in the high load state.

In an embodiment, the early stage of the compression stroke begins from the time instant when the crankshaft rotates 10 degrees after the intake valve is closed to a time instant when the crankshaft rotates 50 degrees after the intake valve is closed, the position near the top dead center of compression ranges in 5 to 20 crank angles before the top dead center or ranges in 5 to 20 crank angles after the top dead center, and the predetermined time interval ranges from a time period required for the crankshaft to rotate 10 degrees to a time period required for the crankshaft to rotate 30 degrees.

In addition, a system for controlling combustion of a natural gas engine is further provided in the present disclosure. The system includes a natural gas engine and a controller, where the controller is configured to perform the method for controlling combustion of a natural gas engine described above.

Since the system according to the present disclosure is integrated with the method described above, the system has the same technical effects as the method.

DETAILED DESCRIPTION

In order to enable those skilled in the art to better understand the technical solutions according to the present disclosure, the present disclosure is described in detail below in conjunction with the selection design method, the selection design apparatus, the accompanying drawings and the embodiments.

Figure 1:
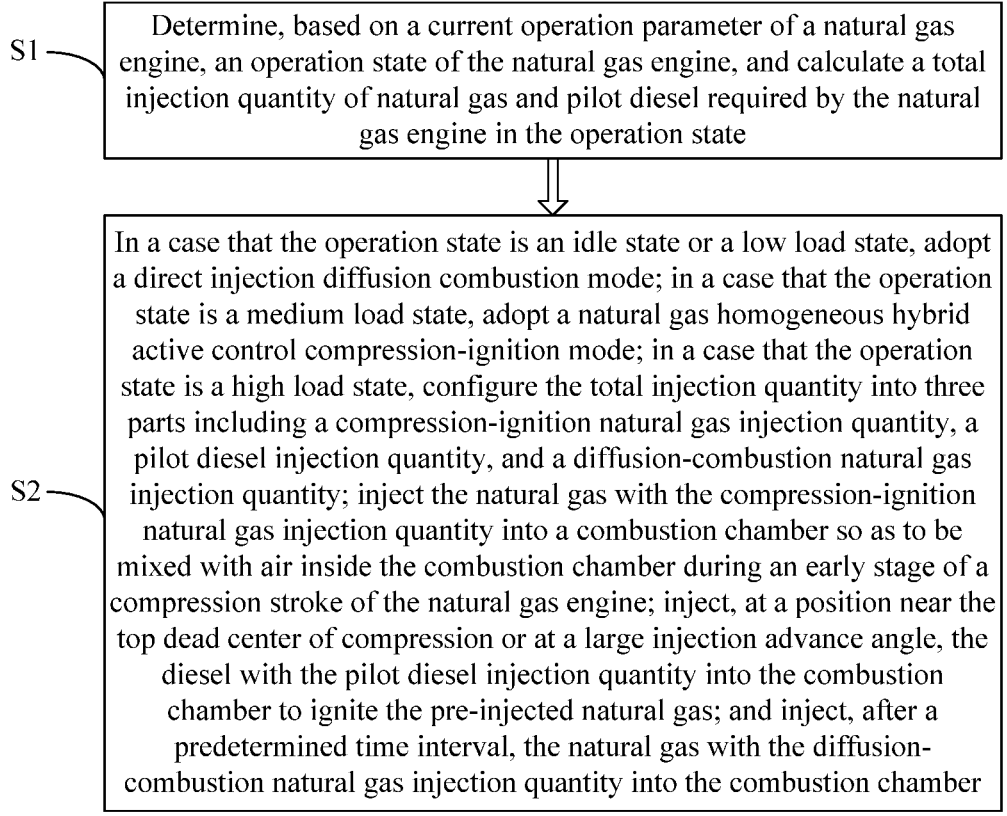
FIG. 1 is a flow chart of method for controlling combustion of a natural gas engine according to an embodiment of the present disclosure.
Figure 2:
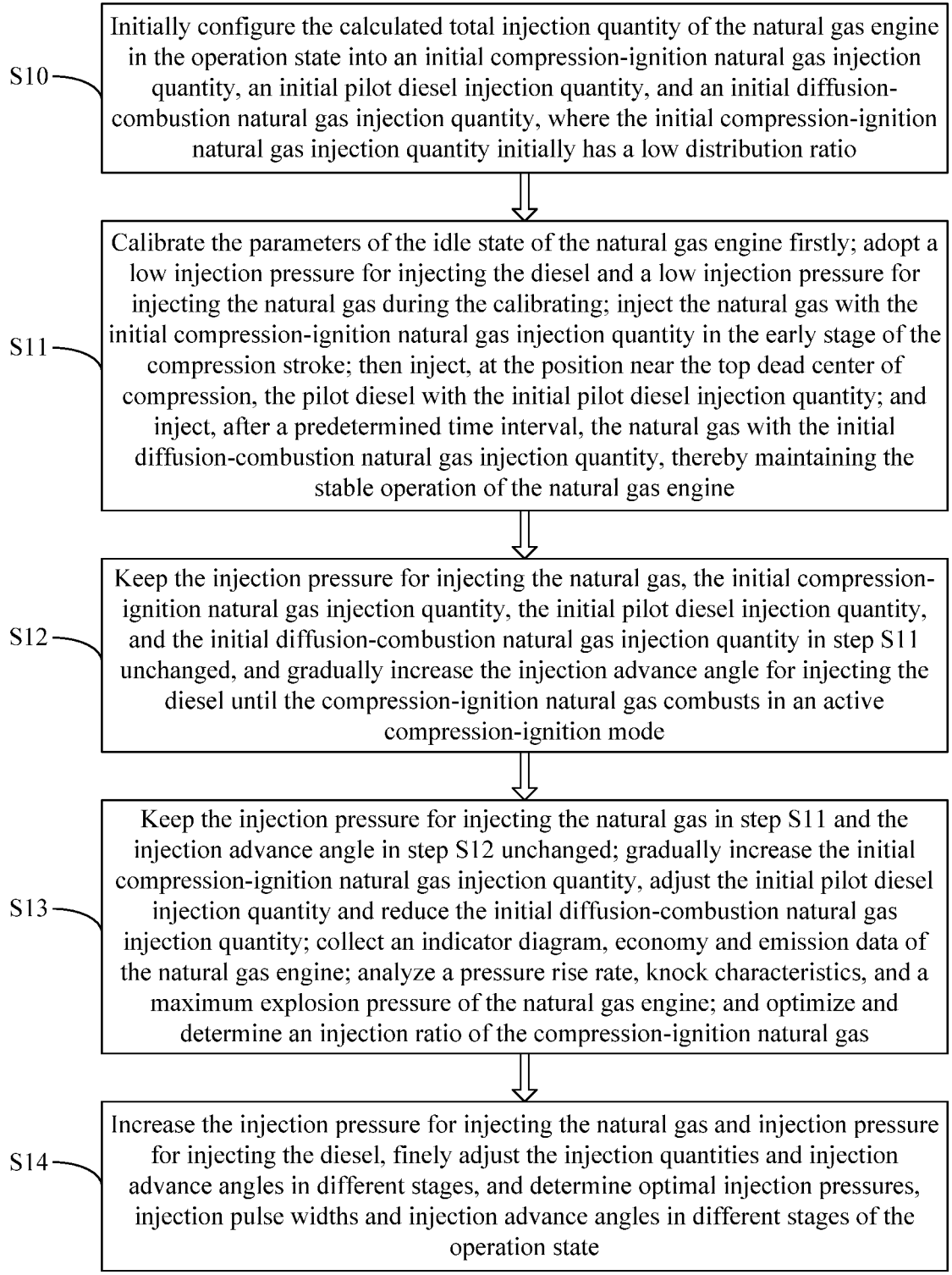
FIG. 2 is a schematic diagram showing a method for calibrating parameters in a map chart according to an embodiment of the present disclosure.

Reference is made to FIG. 1 and FIG. 2. FIG. 1 is a flow chart of a method for controlling combustion of a natural gas engine according to the present disclosure, and FIG. 2 is a schematic diagram showing a method for calibrating parameters in a map chart according to an embodiment of the present disclosure.

In the present disclosure, the fuel of the natural gas engine is mainly natural gas, and diesel herein is injected for igniting the natural gas. A natural gas engine system includes a natural gas engine, a natural gas pressure regulator, a high-pressure natural gas pipeline, an intake manifold, a diesel fuel pipeline, a diesel high-pressure oil pump, an intercooler, and a turbocharger. The specific structure of the natural gas engine system is not described in the specification. The connection relationships and the structures of the components in the natural gas engine system may refer to the conventional technology. The specification mainly describes the method for controlling combustion of a natural gas engine.

The method for controlling combustion of a natural gas engine according to the present disclosure includes the following steps S1 and S2.

In step S1, it is to determine, based on a current operation parameter of a natural gas engine, an operation state of the natural gas engine, and calculate a total injection quantity of natural gas and pilot diesel required by the natural gas engine in the operation state.

The operation state of the natural gas engine may include: an idle state or a low load state, a medium load state, and a high load state. The three load states may be determined by collecting operation parameters of the natural gas engine. The current operation parameter includes one or more of a speed, a torque, an intake manifold temperature and an intake manifold pressure of the natural gas engine. The idle state or a low load state refers to a state in which throttle valve opening is less than 25%. The medium load state is a state in which the throttle valve opening ranges from 25% to 75% (or 80%). The high load state is a state in which the throttle valve opening is higher than 75% (or 80%). Apparently, the three load states may be defined differently for different engines, which does not hinder the understanding and implementing the technical solutions of the present disclosure by those skilled in the art.

The total injection quantity of natural gas and pilot diesel is equal to a sum of an injection quantity of the natural gas and an injection quantity of the diesel.

In step S2, it is to adopt a direct injection diffusion combustion mode in a case that the operation state is an idle state or a low load state. The direct injection diffusion combustion mode is a mode in which the diesel is injected at a top dead center of compression, and then the natural gas is injected.

Apparently, the diesel may be injected once or several times at the top dead center of compression to meet the requirement for diesel injection quantity, and the requirement for the natural gas injection quantity may also be met in the same way. The natural gas may be injected at a predetermined time interval after the diesel is injected. The natural gas is injected to the flame generated by burning the diesel and is ignited by the flame of the diesel, and the natural gas is injected while burning. In the case that the natural gas engine is in the idle state or the low load state, the excess air coefficient is high, the combustion temperature is low, and the amount of the generated NOx and soot is small, so that the natural gas engine can operate stably in the direct injection diffusion combustion mode.

In step S2, it is to adopt a natural gas homogeneous hybrid active control compression-ignition mode in a case that the operation state is a medium load state. The natural gas homogeneous hybrid active control compression-ignition mode is a mode in which the natural gas is injected after an intake valve is closed and the diesel is injected at a position before the top dead center of compression.

In the medium load state, the compression temperature increases, and the thermal efficiency is improved, and the emission is reduced by adopting the natural gas homogeneous hybrid active control compression-ignition mode. In the natural gas homogeneous hybrid active control compression-ignition mode, the natural gas is injected in an early stage of a compression stroke such that the natural gas is fully mixed with air inside a combustion chamber, then the diesel is injected with a large injection advance angle. After the diesel is compressed and burned, pressure and temperature in the combustion chamber increase rapidly, and the premixed natural gas and air are compressed and burned to realize a low-temperature combustion cycle, while reducing the amount of the generated NOx and soot and improving the thermal efficiency. In the natural gas homogeneous hybrid active control compression-ignition mode, the timing of combustion is affected by the temperature of intake air. Therefore, in order to make the natural gas engine have a good adaptability both in a hot region and in a cold region, a temperature control unit after intercooling controls cooling intensity of an intercooler in response to a signal from a controller, based on data collected by a temperature sensor before intercooling, a pressure sensor before intercooling, a temperature sensor after intercooling and a pressure sensor after intercooling. By controlling the cooling intensity of the intercooler with the control system, the temperature after intercooling is adjusted so as to be matched with the time instant for injecting the diesel when the natural gas engine is operating in the hot region or in the cold region, which leads to well control the timing of combustion and broaden the combustion mode with a low load.

In step S2, the total injection quantity is configured into three parts including a compression-ignition natural gas injection quantity, a pilot diesel injection quantity and a diffusion-combustion natural gas injection quantity in a case that the operation state is a high load state. The natural gas with the compression-ignition natural gas injection quantity is injected into the combustion chamber so as to be mixed with air inside the combustion chamber in an early stage of a compression stroke of the natural gas engine. The diesel with the pilot diesel injection quantity is injected, at a position near the top dead center of compression or at a large injection advance angle, into the combustion chamber to ignite the pre-injected natural gas. After a predetermined time interval, the natural gas with the diffusion-combustion natural gas injection quantity is injected into the combustion chamber.

In the present disclosure, the early stage of the compression stroke starts from a time instant when a crankshaft rotates at least 10 degrees after the intake valve is closed. That is, the early stage of the compression stroke begins from the time instant when the crankshaft rotates 10 degrees or more after the intake valve is closed. The early stage of the compression stroke may be judged in terms of an angle the crankshaft rotates. The early stage of the compression stroke may be a time period within which the crankshaft rotates a predetermined angle from a starting point. For example, the early stage of the compression stroke may be a time period within which the crankshaft rotates from 10 degrees to 50 degrees after the intake valve is closed, that is, the early stage of the compression stroke is defined as a time period from a time instant when the crankshaft rotates 10 degrees to a time instant when the crankshaft rotates 50 degrees after the intake valve is closed.

In the case that the operation state is the high load state, fuel is injected into the combustion chamber in three stages: firstly injecting natural gas, injecting diesel, and secondly injecting natural gas. After the firstly injected natural gas is fully mixed with the air inside the combustion chamber, the diesel is injected at a position near the top dead center of compression. The diesel is compressed and burned, then pressure and temperature in the combustion chamber increase rapidly. The mixture of the firstly injected natural gas and air burns rapidly to realize an active compression-ignition. Then, the natural gas is injected secondly to the flame in the combustion chamber, to realize diffusion-combustion of the secondly injected natural gas. The firstly injected natural gas may be injected after the intake valve is closed, and the secondly injected natural gas is injected at an advance angle ranges from 30 to 5 crank angles before the top dead center. The range from 30 to 5 crank angles before the top dead center indicates that the crankshaft needs to rotate 30 degrees to 5 degrees to reach the top dead center. The meaning of the crank angle in this specification is the same as the above explanation.

Different from the above description, the time instant for injecting the diesel is different, and the diesel may be injected at a position near the top dead center. The natural gas is injected in the above way.

In the case that the operation state is the high load state, a combination of the active compression-ignition of natural gas and the diffusion-combustion of natural gas is realized in an operation cycle of the natural gas engine. Since the thermal efficiency of natural gas in the active compression-ignition mode is higher than the thermal efficiency of natural gas in the diffusion-combustion mode, the thermal efficiency of the natural gas in the combination mode is higher than the thermal efficiency in the high pressure direct injection diffusion-combustion mode adopted in the natural gas chamber in the conventional technology. Since the active compression-ignition of natural gas belongs to a low-temperature combustion, the amount of emitted NOx and soot can be both reduced, so that the emission in the combination mode of natural gas is lower than the emission in the diffusion-combustion mode of natural gas. The active compression-ignition mode of natural gas, when adopted separately, has a narrow application range due to the limitation of the pressure rise rate, thus cannot be applied in the high load state. In the combination mode, the diffusion-combustion of natural gas is coupled at a later stage of combustion, reducing a heat release rate and the pressure rise rate in the high load state, and eliminating the limitation of knocking. Thus, a compression ratio the same as that of a diesel engine can be used, and the weight of the active compression-ignition of natural gas may be adjusted reasonably during the calibration process, so as to expand to operate in the high load state of the natural gas engine.

It can be seen from the above description that, with the method for controlling combustion of a natural gas engine according to the present disclosure, there may be three combustion modes based on different operation states of the natural gas engine, greatly improving the thermal efficiency and power performance of the natural gas engine, greatly reducing the amount of the produced soot, making the amount of the PM and PN in the exhaust gas emitted by the natural gas engine much lower than the amount of the PM and PN in the exhaust gas emitted by the diesel engine, thus meeting the strict Euro VI emission standard without providing a post-processing system, and thereby reducing the production cost of a natural gas system.

In the above embodiments, in the case that the operation state is the high load state, distribution of the compression-ignition natural gas injection quantity, the pilot diesel injection quantity, and the diffusion-combustion natural gas injection quantity during the combustion of the natural gas engine is optimized according to the following rule: reducing the compression-ignition natural gas injection quantity and reducing the pilot diesel injection quantity, and increasing the diffusion-combustion natural gas injection quantity, with increasing of load of the natural gas engine.

Further, it may be determined the operation state, a compression-ignition natural gas injection quantity, a pilot diesel injection quantity, and a diffusion-combustion natural gas injection quantity of the natural gas engine in a different stage of the high load state, based on a pre-stored map chart. It is calibrated, in the map chart, the operation state of the natural gas engine which is determined based on a torque or a speed of the natural gas engine, and compression-ignition natural gas injection quantities, pilot diesel injection quantities, and diffusion-combustion natural gas injection quantities in different load states of the natural gas engine.

In an embodiment, it is further calibrated, in the map chart, injection pressures, injection pulse widths and injection advance angles for the compression-ignition natural gas, the pilot diesel and the diffusion-combustion natural gas in different load states of the natural gas engine.

The process of calibrating parameters of each of operation states of the natural gas engine in the map chart includes the following steps S10 to S13.

In step S10, the calculated total injection quantity of the natural gas engine in the operation state is initially configured into an initial compression-ignition natural gas injection quantity, an initial pilot diesel injection quantity, and an initial diffusion-combustion natural gas injection quantity. The initial compression-ignition natural gas injection quantity initially has a low distribution ratio.

In step S11, the parameters of the idle state of the natural gas engine are calibrated firstly. A low injection pressure for injecting the diesel and a low injection pressure for injecting the natural gas are firstly adopted during the calibrating process, and the injection pressure for injecting the diesel and the injection pressure for injecting the natural gas are gradually increased. The natural gas with the initial compression-ignition natural gas injection quantity is injected in the early stage of the compression stroke. Then, the pilot diesel with the initial pilot diesel injection quantity is injected at the position near the top dead center of compression. After a predetermined time interval, the natural gas with the initial diffusion-combustion natural gas injection quantity is injected. Thus, the natural gas engine can be maintained in a stable operation.

A minimum injection pressure for injecting the diesel and a minimum injection pressure for injecting the natural gas are injection pressures with which the diesel and the natural gas is able to be injected.

In step S12, the injection pressure for injecting the natural gas, the initial compression-ignition natural gas injection quantity, the initial pilot diesel injection quantity, and the initial diffusion-combustion natural gas injection quantity in step S11 are kept unchanged, and the injection advance angle for injecting the diesel is gradually increased until the compression-ignition natural gas combusts in an active compression-ignition mode.

In the step S12, the injection advance angle for injecting the diesel ranges from 5 to 50 crank angles before the top dead center. That is, the injection advance angle may change during the crankshaft rotates from 50 degrees before the top dead center to 5 degrees before the top dead center.

In step S13, the injection pressure for injecting the natural gas in step S11 and the injection advance angle in step S12 are kept unchanged, the initial compression-ignition natural gas injection quantity is gradually increased, the initial pilot diesel injection quantity is adjusted, the initial diffusion-combustion natural gas injection quantity is reduced, an indicator diagram, and economy and emission data of the natural gas engine are collected, a pressure rise rate, knock characteristics, and a maximum explosion pressure of the natural gas engine are analyzed, and an injection ratio of the compression-combustion natural gas is optimized and determined. The optimizing and determining the injection ratio of the compression-combustion natural gas means to determine the compression-ignition natural gas injection quantity, the pilot diesel injection quantity, and the diffusion-combustion natural gas injection quantity in the high load state. In adjusting the initial pilot diesel injection quantity, the initial pilot diesel injection quantity may be increased or decreased. An appropriate injection ratio of the natural gas may be selected in considering other operation parameters. Based on a large number of experiments, it is proved that if the injection ratio of the natural gas ranges from 10% to 50%, parameters of the combustion control system are optimal.

In order to accurately determine the injection quantities in different stages of the high load state, the process of calibrating parameters of each of operation states of the natural gas engine in the map chart further includes step S14.

In step S14, the injection pressure for injecting the natural gas and the injection pressure for injecting the diesel are gradually increased, the injection quantities obtained in step S13 and injection advance angles in different stages are finely adjusted, parameters of the natural gas engine are collected, compared and analyzed, and optimal injection pressures, injection pulse widths and injection advance angles in different stages of the operation state are determined.

The above steps do not have an absolute sequence relationship, and the present disclosure only shows a specific implementation.

Further, the process of calibrating parameters of each of operation states of the natural gas engine in the map chart in the above embodiments further includes step S15.

In step S15, after forming the map chart based on the parameters of each of operation states obtained in steps S10 to S14, the map chart in all load states is optimized based on a temperature fluctuation range of intake air of the natural gas engine and a temperature fluctuation range of coolant of the natural gas engine.

That is, by optimizing the parameters of all operation states, the temperature of the intake air of the natural gas engine is maintained within a fluctuation range, and the temperature of the coolant of the natural gas engine is also maintained within a fluctuation range, so that the natural gas engine can operate in a better operation state.

In the above embodiments, the injection pressure for injecting the diffusion-combustion natural gas ranges from 24 MPa to 30 MPa in the high load state.

In the above embodiments, injection pressures for injecting the natural gas and the diesel range from 12 MPa to 18 MPa in the idle state or in the low load state, or/and injection pressures for injecting the natural gas and the diesel range from 18 MPa to 24 MPa in the medium load state.

In the above embodiments, the injection pressure in the map chart ranges from 12 Mpa to 30 MPa, the injection pulse width ranges from a time period in which the crankshaft rotates 5 degrees to a time period in which the crankshaft rotates 30 degrees, and the injection advance angle ranges from 5 to 100 crank angles before the top dead center.

The above ranges are preferred ranges for maintaining the operation of the natural gas engine, and the specific values may have a certain fluctuation.

Based on the above method, a system for controlling combustion of a natural gas engine is further provided in the present disclosure. The system includes a natural gas engine and a controller, where the controller is configured to perform the method for controlling combustion of a natural gas engine described in any one of the above embodiments.

The controller may be an ECU (Electronic control unit) of a vehicle.

Since the above method is integrated in the system according to the present disclosure, the system has the same technical effects as the method.

The embodiments described above are only the preferred embodiments of the present disclosure. It should be noted that for those skilled in the art, improvements and modifications may also be made without departing from the principle of the present disclosure. Such improvements and modifications should also be considered as falling within the scope of protection of the present disclosure.

The invention claimed is:

1. A method for controlling combustion of a natural gas engine, comprising:
   determining, based on a current operation parameter of a natural gas engine, an operation state of the natural gas engine;
   calculating a total injection quantity of natural gas and pilot diesel required by the natural gas engine in the operation state;
   adopting a direct injection diffusion combustion mode in a case that the operation state is an idle state or a low load state, wherein the direct injection diffusion combustion mode is a mode in which the diesel is injected at a top dead center of compression, and then the natural gas is injected;
   adopting a natural gas homogeneous hybrid active control compression-ignition mode in a case that the operation state is a medium load state, wherein the natural gas homogeneous hybrid active control compression combustion mode is a mode in which the natural gas is injected after an intake valve is closed and the diesel is injected at a position before the top dead center of compression;
   configuring the total injection quantity into three parts including a compression-ignition natural gas injection quantity, a pilot diesel injection quantity, and a diffusion-combustion natural gas injection quantity in a case that the operation state is a high load state;
   injecting natural gas with the compression-ignition natural gas injection quantity into a combustion chamber so as to be mixed with air inside the combustion chamber, in an early stage of a compression stroke of the natural gas engine;
   injecting, at a position near the top dead center of compression or at a large diesel injection advance angle, diesel with the pilot diesel injection quantity into the combustion chamber so as to ignite the pre-injected natural gas; and
   injecting, after a predetermined time interval, natural gas with the diffusion-combustion natural gas injection quantity into the combustion chamber,
   wherein the early stage of the compression stroke starts from a time instant when a crankshaft rotates at least 10 degrees after the intake valve is closed,
   wherein in the case that the operation state is the high load state, distribution of the compression-ignition natural gas injection quantity, the pilot diesel injection quantity, and the diffusion-combustion natural gas injection quantity is optimized according to a following rule during the combustion of the natural gas engine:
decreasing the compression-ignition natural gas injection quantity and decreasing the pilot diesel injection quantity, and increasing the diffusion-combustion natural gas injection quantity, with increasing of load of the natural gas engine.

2. The method according to claim 1, further comprising:
determining, based on a pre-stored map chart, the operation state and a compression-ignition natural gas injection quantity, a pilot diesel injection quantity, and a diffusion-combustion natural gas injection quantity during different stages of the natural gas engine in the high load state, wherein in the pre-stored map chart, the operation state of the natural gas engine which is determined based on a torque or a speed of the natural gas engine is calibrated, and a compression-ignition natural gas injection quantity, a pilot diesel injection quantity, and a diffusion-combustion natural gas injection quantity in the different stages of the natural gas engine are calibrated.

3. The method according to claim 2, wherein injection pressures, injection pulse widths and injection advance angles for injecting the compression-ignition natural gas, the pilot diesel, and the diffusion-combustion natural gas in the different stages of the natural gas engine are calibrated in the pre-stored map chart.

4. The method according to claim 2, wherein calibrating parameters of each of operation states of the natural gas engine in the pre-stored map chart comprises:
initially configuring the calculated total injection quantity of the natural gas engine in the operation state into: an initial compression-ignition natural gas injection quantity, an initial pilot diesel injection quantity, and an initial diffusion-combustion natural gas injection quantity;
calibrating parameters of a no load state of the natural gas engine firstly, adopting a low injection pressure of 12 MPa for injecting the diesel and a low injection pressure of 12 MPa for injecting the natural gas during the calibrating and gradually increasing the injection pressure for injecting the diesel and the injection pressure for injecting the natural gas; injecting the natural gas with the initial compression-ignition natural gas injection quantity in the early stage of the compression stroke; injecting, at the position near the top dead center of compression, the pilot diesel with the initial pilot diesel injection quantity; and injecting, after the predetermined time interval, the natural gas with the initial diffusion-combustion natural gas injection quantity, thereby maintaining the natural gas engine to operate stably;
keeping the injection pressure for injecting the natural gas, the initial compression-ignition natural gas injection quantity, the initial pilot diesel injection quantity, and the initial diffusion-combustion natural gas injection quantity unchanged, and gradually increasing an injection advance angle for injecting the diesel until the compression-ignition natural gas combusts in an active compression-ignition mode, wherein the injection advance angle for injecting the diesel ranges from 5 to 50 crank angles before the top dead center; and
keeping the injection pressure for injecting the natural gas and the injection advance angle for injecting the diesel unchanged;
gradually increasing the initial compression-ignition natural gas injection quantity, adjusting the initial pilot diesel injection quantity and reducing the initial diffusion-combustion natural gas injection quantity;
collecting an indicator diagram and economy and emission data of the natural gas engine; analyzing a pressure rise rate, knock characteristics, and a maximum explosion pressure of the natural gas engine; and
optimizing and determining an injection ratio of the compression-ignition natural gas.

5. The method according to claim 4, wherein the calibrating parameters of each of operation states of the natural gas engine in the pre-stored map chart further comprises:
gradually increasing the injection pressure for injecting the natural gas and the injection pressure for injecting the diesel, finely adjusting the injection quantities and injection advance angles in different stages, collecting, comparing and analyzing parameters of the natural gas engine, and determining optimal injection pressures, injection pulse widths and injection advance angles in different stages of the operation state.

6. The method according to claim 5, wherein the calibrating parameters of each of operation states of the natural gas engine in the pre-stored map chart further comprises:
after forming the pre-stored map chart based on the obtained parameters of each of operation states, optimizing the pre-stored map chart in all load states based on a temperature fluctuation range of intake air of the natural gas engine and a temperature fluctuation range of coolant of the natural gas engine.

7. The method according to claim 5, wherein the injection ratio of the compression-ignition natural gas ranges from 10% to 50%.

8. The method according to claim 3, wherein the injection pressure in the pre-stored map chart ranges from 12 Mpa to 30 MPa, the injection pulse width ranges from a time period in which the crankshaft rotates 5 degrees to a time period in which the crankshaft rotates 30 degrees, and the injection advance angle ranges from 5 to 100 crank angles before the top dead center.

9. The method according to claim 4, wherein the current operation parameter based on which the operation state of the natural gas engine is determined comprises one or more of a speed, a torque, an intake manifold temperature, and an intake manifold pressure of the natural gas engine.

10. The method according to claim 1, wherein injection pressures for injecting the natural gas and the diesel range from 12 MPa to 18 MPa in the idle state or in the low load state, or/and injection pressures for injecting the natural gas and the diesel range from 18 MPa to 24 MPa in the medium load state, or/and injection pressures for injecting the natural gas and the diesel range from 24 MPa to 30 MPa in the high load state.

11. The method according to claim 1, wherein the early stage of the compression stroke begins from the time instant when the crankshaft rotates 10 degrees after the intake valve is closed to a time instant when the crankshaft rotates 50 degrees after the intake valve is closed, the position near the top dead center of compression ranges in 5 to 20 crank angles before the top dead center or ranges in 5 to 20 crank angles after the top dead center, and the predetermined time interval ranges from a time period required for the crankshaft to rotate 10 degrees to a time period required for the crankshaft to rotate 30 degrees.

12. A system for controlling combustion of a natural gas engine, comprising:
a natural gas engine; and a controller, configured to perform the method for controlling combustion of the natural gas engine according to claim 1.

\* \* \* \* \*